United States Patent [19]

Benham

[11] 4,264,408
[45] Apr. 28, 1981

[54] METHODS FOR APPLYING PHOSPHORS PARTICULARLY ADAPTED FOR INTAGLIATED PHOSPHOR SCREENS

[75] Inventor: James D. Benham, Roanoke, Va.

[73] Assignee: International Telephone and Telegraph Corporation, New York, N.Y.

[21] Appl. No.: 48,211

[22] Filed: Jun. 13, 1979

[51] Int. Cl.³ .............................................. C03C 25/06
[52] U.S. Cl. ................................. 156/629; 156/663; 313/372; 313/475; 427/71; 427/72
[58] Field of Search ................... 427/64, 71, 72, 157, 427/158; 313/372, 475; 156/629, 663

[56] References Cited

U.S. PATENT DOCUMENTS

| | | | |
|---|---|---|---|
| 2,828,216 | 3/1958 | Delrieu | 427/71 |
| 3,139,340 | 6/1964 | Hays et al. | 313/475 X |
| 3,701,658 | 10/1972 | Clark | 427/71 X |
| 4,025,662 | 5/1977 | Sumner | 427/71 X |

Primary Examiner—Evan K. Lawrence
Attorney, Agent, or Firm—John T. O'Halloran; Peter C. Van Der Sluys

[57] ABSTRACT

A method is described for applying dry phosphor particles on a substrate, such as an intagliated array of fiber optic rods, each etched to form a pit in the surface. In this technique a thin layer of a heated thermoplastic is formed on the surface of the substrate to uniformly coat the etched pits and receive the phosphor particles. The plastic film is heated to receive the particles which are deposited upon the plastic layer. The particles become embedded in the plastic. The plastic layer is removed and the screen is then secured with a binder to fix the particles within the etch pits or cells of the intagliated array.

21 Claims, 3 Drawing Figures

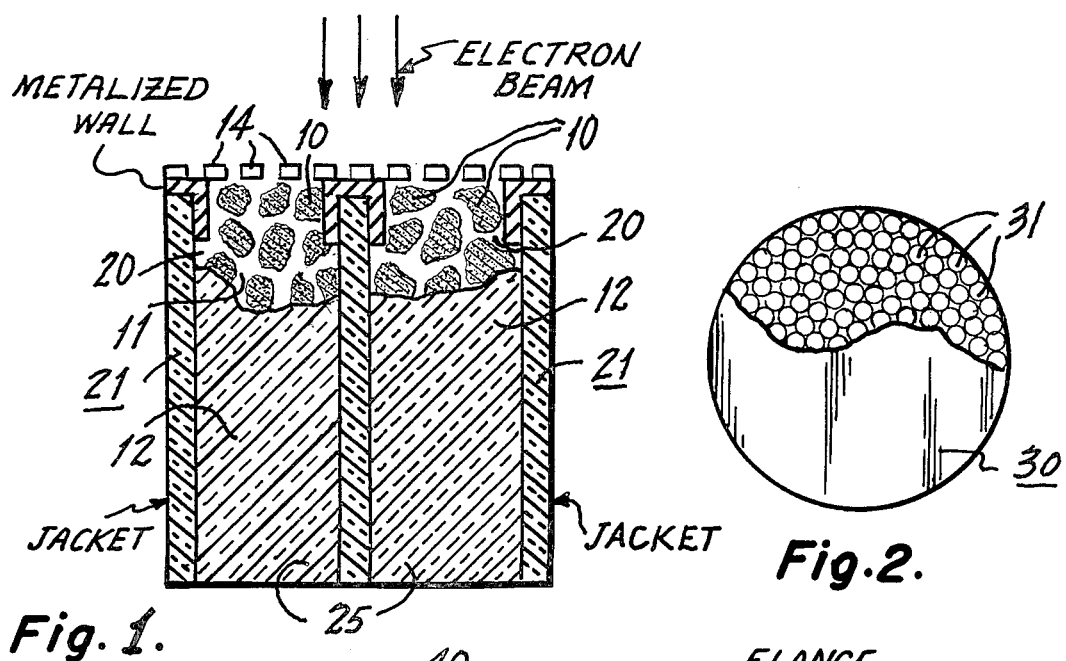
Fig. 1.
Fig. 2.
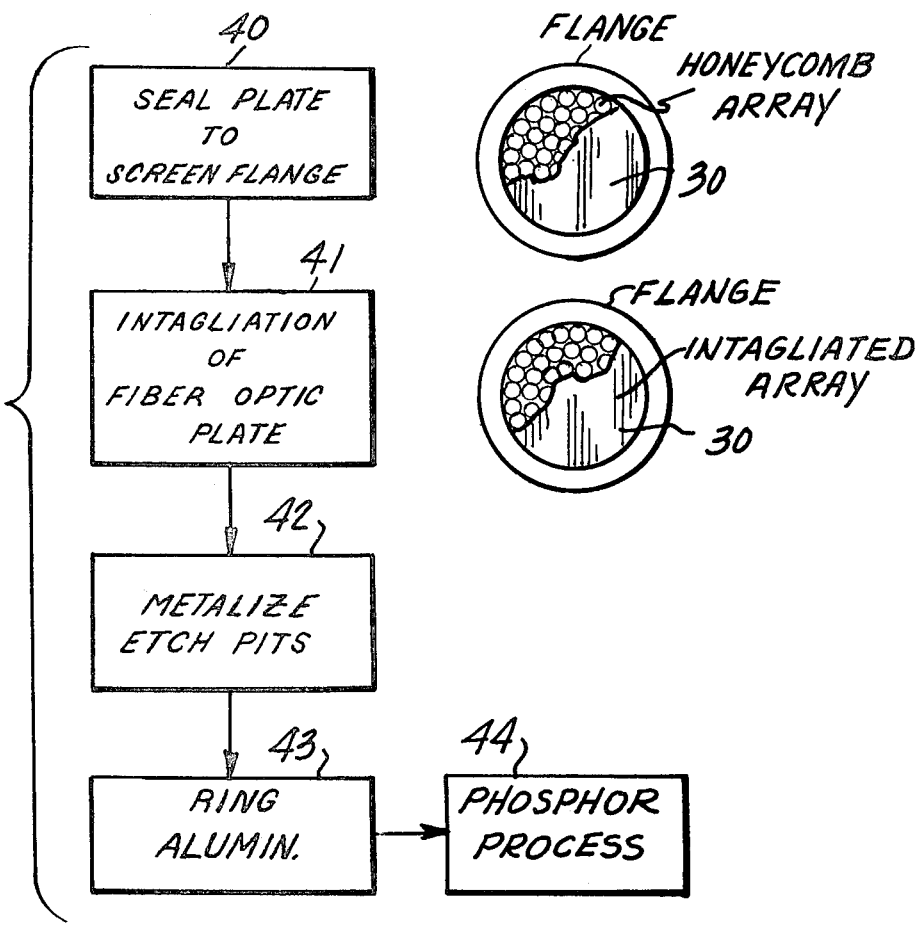
Fig. 3.

METHODS FOR APPLYING PHOSPHORS PARTICULARLY ADAPTED FOR INTAGLIATED PHOSPHOR SCREENS

BACKGROUND OF THE INVENTION

This invention relates to a method of applying phosphors and more particularly to methods and techniques for applying phosphors to provide intagliated phosphor screens.

Fiber optic phosphor screens are employed in a number of devices such as image intensifier tubes used in night vision systems. Certain of these screens are referred to as intagliated phosphor screens.

The basic function of a device as an image intensifier tube is the extension of the region of vision toward lower light levels in the domain of the electromagnetic spectrum. Such tubes extend visibility by gathering more light from the scene with an objective lens and by the use of a photocathode, which has a high quantum efficiency and broader spectral response, one gains increased acuity over viewing with the eye. Limitations of visibility occurring with the use of such tubes are the statistical variation of the photo-cathode current, the contrast sensitivity of the eye in the useful spatial frequency domain and the contrast transfer function of the image intensifier.

It is known that the field resolution is determined along with the other parameters by the contrast transfer function of the tube. More specifically, the higher the contrast function, the better is the probability of target recognition. The probability of target recognition is also proportional to the signal to noise ratio of the pattern under observation. A term designated as MTF (modulation transfer function) is a more frequently used image transfer function. The term has a special significance for an unmabiguous assessment of image quality. With the MTF, the resolution and contrast and thus the amount of perceivable detail and the sharpness of the image is perceived in the entire spatial frequency domain. The MTF of image tubes is a product of the sine wave response of the optical components of the tube, which components include the phosphor screen.

The MTF loss of conventional image screen tubes can be reduced by the use of intagliated fiber optic phosphor screens. It is known that when a phosphor screen is packed in the intagliated fiber optic plate, the MTF of the screened fiber optic plate approaches the MTF of the fiber optic substrate.

In such screens, the phosphor material is deposited in metalized etch pits of the fiber optic core glass and the entire screen surface is aluminized.

In any event, the fabrication of intagliated fiber optic screens according to prior art techniques experienced much difficulty.

Image phosphor screens are less than 10 microns thick and consist of relatively smooth layers of luminescent material. These phosphor screens are frequently water settled with phosphor particles that are one to five microns in size. The screens are coated with a thin, opaque film of aluminum (about one thousand angstroms thick).

In water settling, the phosphor particles are allowed to settle under the influence of gravity from a water suspension of phosphor powder to which potassium silicate or sodium silicate compounds are added as screen binders and sodium bicarbonate or barium acetate as an electrolyte. The electrolyte is a gelling agent which promotes adhesion between the individual phosphor granules and the substrate. It may be added to the settling water after the phosphor particles are settled. At the end of the settling period, the liquid is drained and the phosphor layer is air dried and baked. The screen is then placed in water and coated with a thin organic film by a water floatation technique. A drop of organic film solution is allowed to form a thin film on the top of the water which, by draining the water, settles on the screen. The screen is then aluminized and air baked to remove the organic film.

The aluminum film has a triple role; first, it holds the phosphor screen at a uniform potential by providing it with a conductive layer, second, it prevents light feedback from the phosphor screen to the photo-cathode, third, it serves as a reflector for the phosphor screen, thus improving its efficiency.

In certain cases, the screen is further dark aluminized in order to improve contrast by elimination of light reflections from the screen to the photocathode. A dark aluminum film is usually deposited by evaporation of aluminum in air at a pressure of about $10^{-1}$ torr.

Essentially, a basic problem of phosphor screen deposition onto the "honey combed" structure of the intagliated fiber optic structure is to uniformly compact the phosphor particles into the extremely small etch pits (9.9 micrometer holes). Conventional techniques as gravitational sedimentation of phosphor particles through a colloidal suspension onto the substrate surface is not efficient because the liquid improperly wets the substrate causing air bubbles and thus prevents the phosphor particles from entering many of the etch pits. Likewise, gravitational sedimentation produces a "fluffy" phosphor layer of low resolution.

It is therefore an object of the present invention to provide a process whereby phosphor particles can be accurately and reliably deposited on an intagliated substrate to thereby provide improved intagliated structures for use in image intensifiers, tubes and other applications as well.

SUMMARY OF THE INVENTION

A method of depositing phosphor particles on a substrate such as an intagliated array of fiber optic rods, each etched to form a pit in the surface, comprises the steps of coating a surface of the substrate with a thin plastic film fabricated from a thermoplastic material to uniformly coat the etched pits, heating the assembly to soften the plastic film, depositing dry phosphor particles on said heated thermoplastic coating, removing said thermoplastic coating and binding said particles in place with a binder.

BRIEF DESCRIPTION OF THE DRAWINGS

FIG. 1 is a cross-sectional view of an intagliated fiber optic array as employed with this invention.

FIG. 2 is a top view of an array of fiber optics.

FIG. 3 is a block diagram depicting a series of steps in fabricating an intagliated fiber optic assembly employing a phosphor deposition technique according to this invention.

DETAILED DESCRIPTION OF THE INVENTION

Referring to FIG. 1, there is shown a cross-sectional view of a portion of an intagliated fiber optic screen. The phosphor material or particles 10 are deposited in metalized etch pits 11 of the fiber optic core glass 12 and the surface of the screen is metalized with a thin opaque layer of aluminum 14. The etch pits are approimately between six to ten micrometers in diameter and between ten to twelve micrometers in depth. Under electron bombardment, the light generated in the individual core cells 20 is trapped in the fiber optic 21 and channeled through the fiber to the output end of the fiber optic plate 25 with negligible spread of light caused by cross talk. Because the area of the mosaic occupied by the light transmitting fiber cores is only about sixty percent of the total area, the efficiency of intagliated fiber optic phosphor screens is at best sixty percent of conventional screens. In addition to the mosaic structure losses, the light transfer efficiency may be further reduced by the increased optical contact of the phosphor material with the fiber optic substrate.

FIG. 2 shows a top pictorial view of a fiber optic plate 30. The plate 30 is shown circular in configuration, but any suitable geometrical orientation may be employed as square, hexagonal and so on. Physically, the fiber optic plate 30 is a two dimensional array of light propagating fibers 31 fused together with a precise orientation of fibers to constitute a solid vacuum tight plate. Each fiber, as shown in FIGS. 1 and 2 of the plate 30 consists of a core (12 of FIG. 1) glass clad with a jacket glass of a lower index of refraction, and with an absorbing coating for the prevention of light cross talk between adjacent channels. The diameter of the glass fiber 31 is in the range of five to ten micrometers.

The fabrication technique of fiber optic plates as 30 consists of drawing the clad fibers or rods smaller and then fusing them into a solid vacuum tight bundle. The bundle is then sliced and polished at the top and bottom surfaces to the final shape of the fiber optic plate. With fiber optic plates as 30, complex input image surfaces can be transferred into any desired output surface shape. The three most frequently used input and output surface combinations are plano-plano, plano-concave and the convex-concave shapes.

According to the desired image transfer characteristics, fiber optic plates as 30 are fabricated from cylindrical, tapered and twisted rods. Fiber optics fabricated from axially oriented cylindrical rods transmit an erect image with unity magnification. Tapered fiber optics consisting of tapered rods transmit a magnified erect image. The fiber optic twisted rods invert the transmitted image. Hence, as one can see, any of the types of fiber optic rods can be used with the present techniques.

Referring to FIG. 3, a flow diagram of the process for applying phosphors to intagliated fiber optic plates will be described.

As a first step, the fiber optic plate 30 is formed as above described. The fiber optic is frit sealed to a metal ring. This is done by standard procedures well known in the industry and is represented as module 40 in FIG. 3. The ground, polished and flanged fiber optic plate 30 is then intagliated by an acid etching technique to produce a "honey-comb" structure on the screen side of the plate 30. The intagliation process is depicted in FIG. 3 as module 41. Essentially, intagliation of the fiber optic substrate or plate 30 may be accomplished by acid etching of the core glass. Suitable solvents of glass are nitric, hydrofluoric, hot phosphoric and hydrochloric acids. Fiber optic plates as indicated consist of an array of fibers, each consisting of a core glass clad with a jacket glass of a lower index of refraction. The difference between the high and low indexes is in the silica network. High refraction index glasses have a weaker silica network than the low refraction index glasses. The basic properties of intagliation lies in the difference in the silica network of the two glasses. By immersion of the fiber optic plate into a corrosive solvent, the etchant will attack the core glass at a faster rate than the jacket glass. Acids attack the alkali oxides and other constituents of the glass and slightly attack the silica. By dissolving the alkali and the basic oxide components of the core glass, a weak silica network remains which is insufficient to support itself and the network disintegrates. The attack rate of glass by corrosive solutions is linear with time. The cladding or jacket glass is not significantly attacked by the acid. When selecting an acid or etchant for fiber optics, one must consider the following criterion; The etchant should dissolve only the core glass and have a negligible corrosive effect on the cladding glass. The etchant should have a controlled etch rate on the fiber.

Nitric acid forms salts of greater solubility than hydrochloric acid, while all silicate glasses are attacked by hydrochloric and hot phosphoric acids. The nitric acid is a faster solvent of glass than hydrochloric acid and is therefore more difficult to control. On the other hand, hydrochloric acid dissolves the core glass with excellent control and has little effect on the cladding glass.

Block 42 indicates a further metalization step wherein a metal is deposited on the surface of the substrate to metallize the etch pits. The metal which may be aluminum or inconel is deposited as a thin uniform layer by conventional techniques.

Block 43 depicts the steps in which the assembly can then be ring aluminized as a conventional process to form the screen sub-assembly. In this manner, aluminum is evaporated about the periphery of the flange as is known in the art.

Block 44 depicts the step of applying the phosphor to the intagliated array. This technique is unique and provides for extreme advantages over prior art techniques.

The technique of applying phosphor particles to the intagliated substrate involves a dry phosphor technique employing an application of phosphor particles on a thin layer of heated thermoplastic formed in the substrate. In the dry phosphor application technique to be described, the screen substrate is coated with a thin plastic film by spinning as a first step. As a next step, the plastic film is baked and the temperature is raised for the phosphor application. The phosphor particles are then deposited on the plastic film by spraying, brushing, dusting where they are embedded in the plastic film. The screen with the embedded phosphor particles is then air baked to remove the organic film. Finally, a suitable binder for binding the particles to the fiber optic is used. The screen is filmed and aluminized, if desired, by conventional techniques used for image tube screens and as described above. The dry phosphor technique enables one to employ a greater variety of phosphors of different size and type to therefore achieve higher density and increased efficiency of operation.

The steps employed in the dry phosphor application technique according to this invention are as follows:

(1) After the fiber optic substrate has been treated as above described as etched, washed and so on, the fiber optic substrate is coated with a thermoplastic, such as an acrylic by spinning a solution that has been uniformly applied to the intagliated surface. The plastic solution as spun covers the surface of the substrate with a thin but uniform layer of thermoplastic. Each etch pit is so covered.

(2) After coating the substrate with the plastic, the assembly is raised to a temperature of approximately 220° C. and soaked for five minutes. A small amount of phosphor is applied to the plastic coated surface. This phosphor is prepared by elutriation. Essentially, the process is extremely versatile and one requires a particle size between two to four microns. This is accomplished by elutriation in alcohol for the desired particle size. The prepared phosphor particles are rubbed into the plastic with a soft sponge or other suitable device.

(3) The assembly is baked at about 400° C. for one hour or for a time necessary to remove the plastic layer.

(4) The surface is then lightly polished or treated with a soft material such as filter paper to remove the excess phosphor.

(5) The phosphor particles are fixed or bound to the etch pits by immersion of the substrate in a solution of potassium silicate.

(6) The substrate is lacquered, aluminized and baked further.

The above application technique has utility in the applications of phosphor particles to intagliated substrates as well as other devices and enables one to employ dry phosphors to provide high quality and high efficient phosphor coatings. Using the technique, one can employ a wide range of phosphors all handled in the same manner, thus providing a universal capability and to achieve high density and efficiency.

I claim:

1. A method of dry depositing phosphor particles on a substrate, said substrate having an intagliated surface comprising a honeycomb array of a plurality of fiber optic rods, each etched to form a pit in the surface manifesting said array, comprising the steps of:
depositing a thin uniform layer of metal on said intagliated surface to metallize each of said etch pits,
spin coating said intagliated surface of said substrate with a thin thermoplastic film to uniformly coat said metallized etch pits,
heating the assembly to bake the film at a predetermined temperature to soften the same,
depositing dry phosphor particles on the heated thermoplastic coated surface,
removing said thermoplastic coating by heating said substrate at a higher temperature than said predetermined temperature to remove the thermoplastic to cause said particles to enter said metallized etch pits,
binding the particles in place in said etch pits with a binder.

2. The method according to claim 1 wherein said step of spin coating said intagliated surface is provided by uniformly applying a solution of a thermoplastic to said substrate and spinning the coated substrate.

3. The method according to claim 2 wherein said thermoplastic is an acrylic plastic.

4. The method according to claim 1 wherein the step of heating to soften the film includes heating the substrate to a temperature of about 220° C. for approximately five minutes.

5. The method according to claim 1 wherein the step of depositing phosphor particles includes depositing said particles having a diameter within the range of two to four microns.

6. The method according to claim 1 further including the step of rubbing said assembly after deposition of said particles to remove any excess particles prior to said step of removing said plastic coating.

7. The method according to claim 1 wherein the step of removing said plastic coating includes baking said substrate at a temperature of about 400° C. for a period of time sufficient to remove said coating.

8. The method according to claim 1 including the step of polishing said surface after removing said plastic coating to remove excess phosphor particles and to smooth said intagliated surface.

9. The method according to claim 1 wherein the step of binding said particles in place includes immersing said assembly in a silicate solution and then spin drying said assembly.

10. The method according to claim 9 wherein said silicate solution is a solution of potassium silicate and said assembly is immersed therein for a period of approximately five minutes.

11. The method according to claim 1 further including the steps of:
lacquering said assembly after binding said particles thereto; and
applying a thin opaque layer of aluminum to said surface of said assembly containing said phosphor particles.

12. The method according to claim 1 wherein said particles of phosphor are zinc sulfide particles.

13. The method according to claim 1 wherein said particles of phosphor are zinc cadmium sulfide particles.

14. The method according to claim 1 wherein said substrate is an intagliated fiber optic array adapted for use as a screen for an image intensifier tube.

15. The method according to claim 1 wherein said pits on said fiber optic surface are approximately between six to ten micrometers in diameter and between ten to twelve micrometers in depth.

16. The method according to claim 1 comprising the step of etching said pits in said fiber optic rods by inserting said array in an etchant solution at a temperature of about 50° C. for a period determined by the depth of said pit.

17. The method according to claim 16 wherein said etchant solution is a solution of an acid selected from the group consisting of hydrochloric, nitric, phosphoric or hydrofluoric acid.

18. The method according to claim 1 wherein said intagliated substrate is the screen of an image intensifier tube.

19. A method of dry depositing phosphor particles on a surface of an intagliated substrate of the type consisting of a plurality of fused fiber optic cables, each having an etched aperture on a surface to formulate said intagliated surface, comprising the steps of:
spin coating said intagliated surface with an acrylic plastic to uniformly coat said apertures with said plastic,
heating said coated assembly to a temperature of about 200° C. for a period of approximately five minutes to bake and soften said plastic coating,
uniformly applying dry phosphor particles to said plastic coated surface,
baking said assembly at about 400° C. for a period of about one hour to remove said acrylic plastic coating to cause said particles to enter said etch pits, binding said phosphor particles in place in said pits by immersing said assembly in a silicate solution.

20. The method according to claim 19 wherein said step of binding includes immersing in a potassium silicate solution, soaking said substrate in said solution and thereafter spin drying said substrate.

21. The method according to claim 19 wherein said phosphor particles are between two to four microns in diameter and are fabricated from phosphor material.

* * * * *